H. D. KELLY.
COFFEE URN.
APPLICATION FILED JUNE 19, 1908.
907,607.
Patented Dec. 22, 1908.
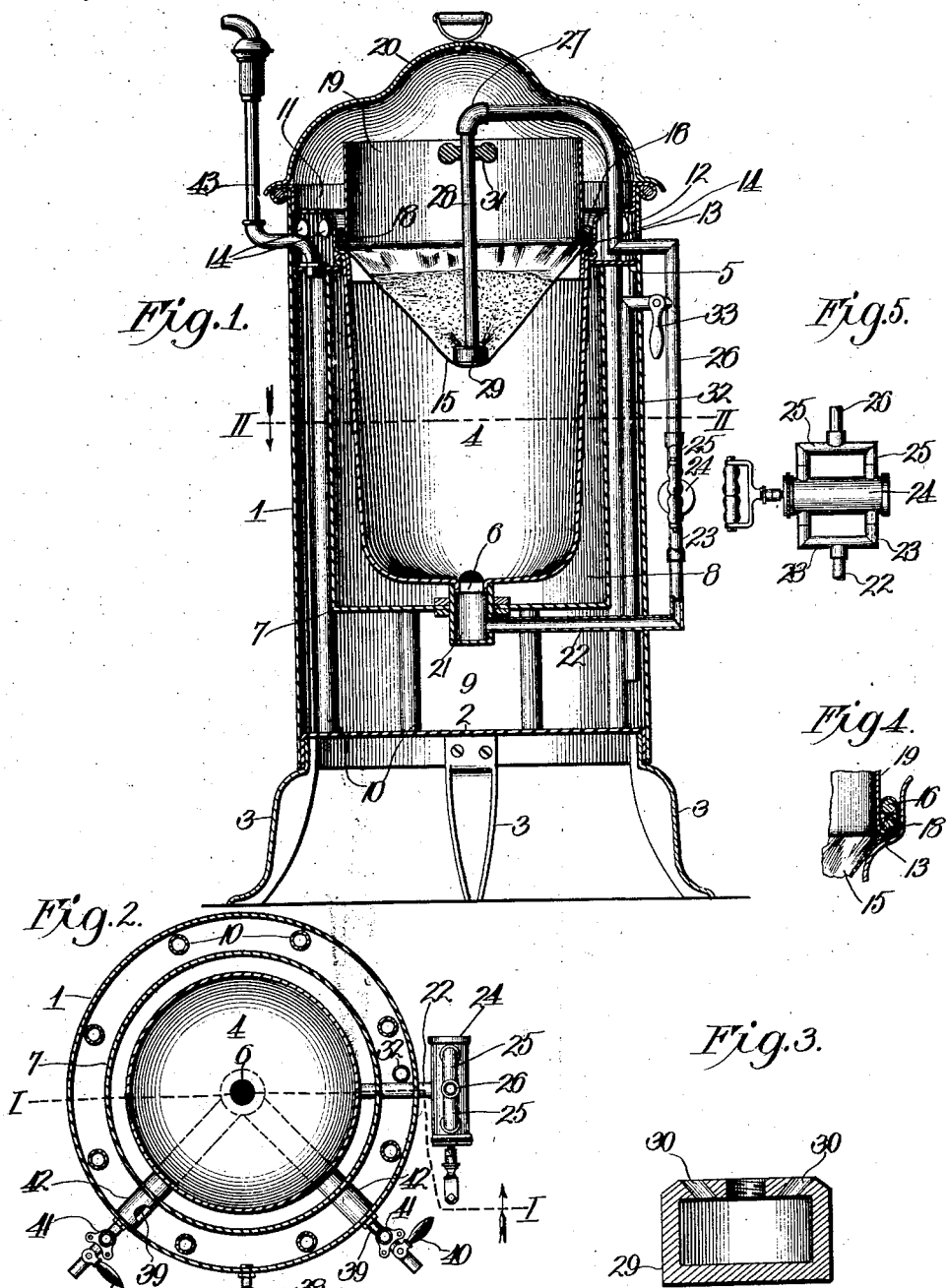

UNITED STATES PATENT OFFICE.

HENRY D. KELLY, OF KANSAS CITY, MISSOURI.

COFFEE-URN.

No. 907,607.    Specification of Letters Patent.    Patented Dec. 22, 1908.

Application filed June 19, 1908. Serial No. 439,396.

*To all whom it may concern:*

Be it known that I, HENRY D. KELLY, a citizen of the United States, residing at Kansas City, in the county of Jackson and State of Missouri, have invented certain new and useful Improvements in Coffee-Urns, of which the following is a specification.

This invention relates to coffee-urns of that class usually employed in hotels and restaurants and is designed more especially as an improvement in the coffee-urn covered by Patent No. 814960 issued to the Combination Urn Manufacturing Co. of Chicago, Ill., as assignee, on March 13, 1906, the object of this invention being to produce an efficient and reliable coffee-urn of that type whereby boiling water may be sprayed upwardly through a mass of ground coffee for the purpose of agitating and thus come into more intimate relation with the ground coffee and thus produce liquid coffee quickly without losing any of its strength.

A further object is to produce means whereby the liquid coffee can be pumped from the bottom of the liquid-coffee-containing receptacle and forced through the ground-coffee in the bag back into said receptacle and thus eliminate the necessity of drawing off the coffee through the faucet and pouring it back into the receptacle as commonly practiced, for the purpose of mixing it thoroughly and making it of uniform strength and quality.

With these general objects in view and others as hereinafter appear, the invention consists in certain novel and peculiar features of construction and organization as hereinafter described and claimed; and in order that it may be fully understood reference is to be had to the accompanying drawing, in which;

Figure 1 is a vertical section taken on the line I—I of Fig. 2. Fig. 2 is a horizontal section taken on the line II—II of Fig. 1. Fig. 3 is an enlarged vertical section of the water-spraying nozzle. Fig. 4 is an enlarged vertical section of a part of the ground-coffee bag. Fig. 5 is a side view of a pump and its immediate connections.

In the said drawings 1 indicates a cylindrical tank having a raised bottom 2 and mounted upon supporting legs 3. Arranged concentrically within said tank is a liquid-coffee-containing receptacle 4, the same being snugly embraced by and suspended from a horizontal collar 5 fitting snugly within tank 1 near the upper end of the same, and the bottom of said receptacle 4 is provided with a strainer-covered discharge nipple 6.

7 indicates a tank-shaped jacket arranged concentrically within tank 1 and spaced from the same and receptacle 4 to form the inner wall of the tank and provide an air chamber 8 immediately surrounding the said receptacle, the chamber 9 formed by and between the tank and said jacket being adapted to be charged with water by a supply pipe not shown, because of common and well known arrangement.

11 indicates a substantially step-shaped ring suspended from the top of the tank 1 into the receptacle 4 and forming a cover for the space or chamber 12 into which tubes 10 discharge, the undermost or lowest step of said ring or ring-cover as it will be hereinafter termed, constituting an upwardly disposed shoulder 13 for a purpose which hereinafter appears, and to provide for a proper circulation of the hot air through pipes 10 into chamber 12, the tank 1 is formed with a series of apertures 14.

15 is an inverted ground-coffee bag provided at its upper end with and depending from a ring 16 which serves to hold the bag open and to support the same within receptacle 4 and the inner portion of the ring-cover by either resting upon the shoulder 13 of the latter or upon the outturned bead 18 formed at the lower end of a circular wall 19 which forms an extension for the ground-coffee bag and projects by preference beyond the upper end of tank 1 to guard against ground-coffee in the bag, when agitated, overflowing the tank or the top-most step of the ring-cover, and to compel all of the liquid coffee to percolate through the bag to enter the underlying receptacle. I prefer to arrange the extension within ring 16 so that the bead of said extension shall underlie and form the direct support for said ring 16 and rest upon the shoulder 13 with the ontiguous portion of the bag interposed between it and the shoulder.

20 indicates the cap or cover for the tank which serves to retain the aroma and thus improve the quality of the coffee.

21 indicates a cup fitting with an air and liquid tight joint in an opening in the bottom of jacket 7 and receiving the depending discharge nipple 6 of receptacle 4.

22 is a pipe extending outward from cup 21, through the tank 1 and then upward and communicating through branch pipes 23 with a pump 24 having discharge branch pipes 25 connected to a pipe 26 extending upward and into chamber 12 and thence upward through ring-cover 11 into the cap 20 and then radially inward over the extension 19 of the coffee-bag and terminating centrally of said extension in a down-turned elbow 27 from which detachable nozzle 29 having a series of upwardly and outwardly pitched discharge-orifices 30, as shown clearly in Fig. 3, this nozzle being arranged within and near the bottom or apex of the inverted conical bag 15 and embedded in or underlying the mass of ground coffee with which such bag is charged, the said pipe 28 being preferably provided with the handle 31 by which it is screwed into or unscrewed from elbow 27, it being obvious that it would be impracticable to secure the coffee-bag and its extension in or remove it from position unless pipe 28 was supported.

32 indicates a pipe connecting the lower part of water-chamber 9 with pipe 26 above the pump and 33 is a valve controlling the passage of pipe 32.

37 indicates a valve-controlled water discharge pipe communicating with chamber 9 and 38 a glass gage-tube communicating with pipe 37 to indicate the quantity of water in tank 1.

39 indicates liquid coffee-discharge spouts communicating with cup 21 as in the patent hereinbefore referred to, and provided with controlling valves 40 and with glass gages 41 to indicate the height of the liquid-coffee standing in receptacle 4.

42 are tubes surrounding the coffee-discharge spouts 39 within tank 1 in order to provide an air space around said spouts to guard against the same being chilled or unduly heated by cold or boiling water in chamber 9, the parts 39 to 42 inclusive forming no part of the present invention as they correspond substantially to parts of the aforesaid patent.

Assuming now that the tank 1 is charged with the required volume of water and that the latter has been raised to the boiling point as will be indicated by steam escaping through pipe 43 communicating at its lower end with chamber 9, the person in control removes the cap 20 and deposits the required quantity of ground coffee in the bag so that it shall completely cover and hide from sight the nozzle 29. He then replaces the cap and opens valve 33 to permit the pressure of the steam generated to cause the hot water from chamber 9 to pass through pipe 32 into pipe 26 and up through the latter to pipe 28 and down through the same into nozzle 29 from which it escapes outwardly and upwardly in the shape of fine jets, which as will be readily understood, agitate the mass of ground coffee so as to come into contact with every particle of the same, in fact the agitation is so violent that the coffee appears as though it were boiling. The liquid-coffee thus produced percolates through the bag into the receptacle 4. When the desired quantity of liquid-coffee has been produced, the valve 33 is closed and the pump is manipulated for a minute or so, this manipulation of the pump resulting in pumping the coffee from the receptacle and causing it to pass through the ground coffee and then reënter the receptacle 4, thus in effect, repouring the liquid coffee and serving to extract all of the strength and quality. During the entire coffee-making and repouring operations the cap 20 remains in place so as to guard against the escape of the aroma.

From the above description it will be apparent that this coffee urn embodies the features of advantage enumerated as desirable in addition to those of the urn covered by the patent hereinbefore referred to, and while I have illustrated and described the preferred embodiment of my invention, it is to be understood that I reserve the right to make such changes as properly fall within the spirit and scope of the appended claims.

Having thus described the invention what I claim as new and desire to secure by Letters Patent is:—

1. A coffee urn, comprising a water tank, a liquid-coffee receptacle arranged within the tank, a ground-coffee bag depending into said receptacle, an upwardly-discharging nozzle within the bag, a valve-controlled pipe communicating at its lower end with the tank and at its opposite end with said nozzle, a pipe communicating with the liquid-coffee receptacle at one end and with the said valve-controlled pipe at a point between the valve of the latter and said nozzle, and means for pumping liquid-coffee from said receptacle through the last-named pipe and a part of the first-named pipe above its valve, to said nozzle.

2. A coffee urn, comprising a tank, a liquid-coffee receptacle within said tank, a ring-cover depending into the tank and the upper end of said receptacle and provided with an upwardly-disposed shoulder, a coffee-bag depending into said receptacle from said shoulder, an upward prolongation or extension for said coffee bag, a nozzle in the coffee bag, a valve-controlled pipe communicating at its lower end with the tank and terminating at its upper end above said nozzle, and a pipe secured to the upper end of the first-named pipe and carrying said nozzle.

3. A coffee urn, comprising a tank, a liquid-coffee receptacle within said tank, a ring-cover depending into the tank and the upper end of said receptacle and provided with an upwardly-disposed shoulder, a coffee bag depending into said receptacle from said shoulder, an upward prolongation or extension for said coffee bag, a nozzle in the coffee bag, a valve-controlled pipe communicating at its lower end with the tank and terminating at its upper end above said nozzle, a pipe secured to the upper end of the first-named pipe and carrying said nozzle, and a pump-equipped pipe communicating at its lower end with the said receptacle and at its upper end with the first-named pipe between the valve of the latter and said nozzle.

In testimony whereof I affix my signature, in the presence of two witnesses.

HENRY D. KELLY.

Witnesses:
 L. B. WHERRITT,
 G. Y. THORPE.